US012605966B2

(12) United States Patent
Griebel et al.

(10) Patent No.: US 12,605,966 B2
(45) Date of Patent: Apr. 21, 2026

(54) NON-PNEUMATIC TIRE WITH FIBER METAL LAMINATE CONSTRUCTION

(71) Applicant: Bridgestone Americas Tire Operations, LLC, Nashville, TN (US)

(72) Inventors: Jared J. Griebel, Orange Village, OH (US); Benjamin E. Rimai, Copley, OH (US); Bradley S. Plotner, Canton, OH (US); Brandon P. Nelson, Stow, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 409 days.

(21) Appl. No.: 18/039,998

(22) PCT Filed: Dec. 9, 2021

(86) PCT No.: PCT/US2021/072834
§ 371 (c)(1),
(2) Date: Jun. 2, 2023

(87) PCT Pub. No.: WO2022/133406
PCT Pub. Date: Jun. 23, 2022

(65) Prior Publication Data
US 2024/0025208 A1      Jan. 25, 2024

Related U.S. Application Data

(60) Provisional application No. 63/127,444, filed on Dec. 18, 2020.

(51) Int. Cl.
B60C 7/14          (2006.01)
B60C 7/22          (2006.01)

(52) U.S. Cl.
CPC ................ *B60C 7/146* (2021.08); *B60C 7/22* (2013.01)

(58) Field of Classification Search
CPC .......... B60C 7/146; B60C 7/22; B60C 9/0007
See application file for complete search history.

(56) References Cited

U.S. PATENT DOCUMENTS 5,951,800 A       9/1999  Pettit
2005/0048260 A1   3/2005  Modin et al.
(Continued)

FOREIGN PATENT DOCUMENTS

CN          204915130          12/2015
CN          108367596 A  *  8/2018  ........... B60C 1/0041
(Continued)

OTHER PUBLICATIONS

International Search Report & Written Opinion; Corresponding PCT Application Serial No. PCT/US2021/072834; Authorized Officer Chan Yoon Hwang; Dated Apr. 4, 2022.
(Continued)

*Primary Examiner* — S. Joseph Morano
*Assistant Examiner* — Alex Palmer
(74) *Attorney, Agent, or Firm* — Shaun J. Fox; Bryan J. Jaketic

(57)          ABSTRACT

A non-pneumatic tire includes a lower ring having a first diameter and an upper ring having a second diameter greater than the first diameter. The upper ring is substantially coaxial with the lower ring. Support structure connects the lower ring to the upper ring. At least one of the lower ring, the upper ring, and the support structure includes a fiber metal laminate having at least one metal foil layer and at least one fiber and resin combination layer.

20 Claims, 6 Drawing Sheets

(56)    References Cited

U.S. PATENT DOCUMENTS

| | | |
|---|---|---|
| 2014/0329069 A1 | 11/2014 | Wilson |
| 2016/0288571 A1 | 10/2016 | Dotson et al. |
| 2017/0008342 A1 | 1/2017 | Martin et al. |
| 2017/0190150 A1 | 7/2017 | Gunnink |
| 2017/0232787 A1 | 8/2017 | Hasegawa |
| 2017/0297373 A1 | 10/2017 | Sportelli et al. |
| 2018/0001704 A1 | 1/2018 | Reinhardt |
| 2018/0029422 A1 | 2/2018 | Thompson |
| 2018/0345610 A1 | 12/2018 | Delfino et al. |

FOREIGN PATENT DOCUMENTS

| | | | | |
|---|---|---|---|---|
| CN | 111479702 | 7/2020 | | |
| CN | 111845208 | 10/2020 | | |
| JP | 2008132951 | 6/2008 | | |
| JP | 2011219009 | 11/2011 | | |
| JP | 2018103851 | 7/2018 | | |
| WO | WO-2017103515 A1 * | 6/2017 | ............. | C22C 38/18 |
| WO | 2020139623 | 7/2020 | | |

OTHER PUBLICATIONS

Supplementary European Search Report; Corresponding EP Application No. 21908008; Oct. 8, 2024.

* cited by examiner 530
528
526
524
522
520
518
516
514
512
510

500

1000

1302

1300

1304

1200

1130

NON-PNEUMATIC TIRE WITH FIBER METAL LAMINATE CONSTRUCTION

FIELD OF INVENTION

The present disclosure relates to non-pneumatic tires. More particularly, the present disclosure relates to a non-pneumatic tire with fiber metal laminate construction.

BACKGROUND

Various tire constructions have been developed that enable a tire to run in an uninflated or underinflated condition. Non-pneumatic tires do not require inflation, while "run flat tires" may continue to operate after being punctured and becoming partially or completely depressurized, for extended periods of time and at relatively high speeds. Non-pneumatic tires may include support structure, such as spokes, that connects a lower ring to an upper ring. In some non-pneumatic tires, a circumferential tread is attached to the upper ring of the tire.

It is known to provide the rings or spokes of non-pneumatic tires with structural reinforcing elements. Non-pneumatic tires provided with known structural reinforcing elements, however, may suffer from problems regarding tire uniformity, crack propagation, fatigue resistance, or impact resistance.

SUMMARY OF THE INVENTION

In one embodiment, a non-pneumatic tire includes a lower ring having a first diameter and an upper ring having a second diameter greater than the first diameter. The upper ring is substantially coaxial with the lower ring. Support structure connects the lower ring to the upper ring. At least one of the lower ring, the upper ring, and the support structure includes a fiber metal laminate having at least one metal foil layer and at least one fiber and resin combination layer.

In another embodiment, a method of manufacturing a non-pneumatic tire includes providing a lower ring having a first diameter, an upper ring having a second diameter that is greater than the first diameter, and support structure. The method further includes connecting the lower ring to the upper ring using the support structure. Providing the lower ring, the upper ring, and the support structure includes manufacturing at least one of the lower ring, the upper ring, and the support structure with a fiber metal laminate that includes at least one metal foil layer and at least one fiber and resin combination layer.

In yet another embodiment, a non-pneumatic tire includes a lower ring and a circumferential tread disposed above the lower ring. The circumferential tread includes a tread layer and a tread band. Support structure interconnects the lower ring to the tread band to attach the circumferential tread to the lower ring. At least one of the lower ring, the tread band, and the support structure includes a fiber metal laminate having at least one metal foil layer and at least one fiber and resin combination layer.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

FIG. 4b is a perspective peel away view of FIG. 4a; and

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Prepreg" refers to a composite material made from pre-impregnated fibers and a partially cured polymer matrix.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
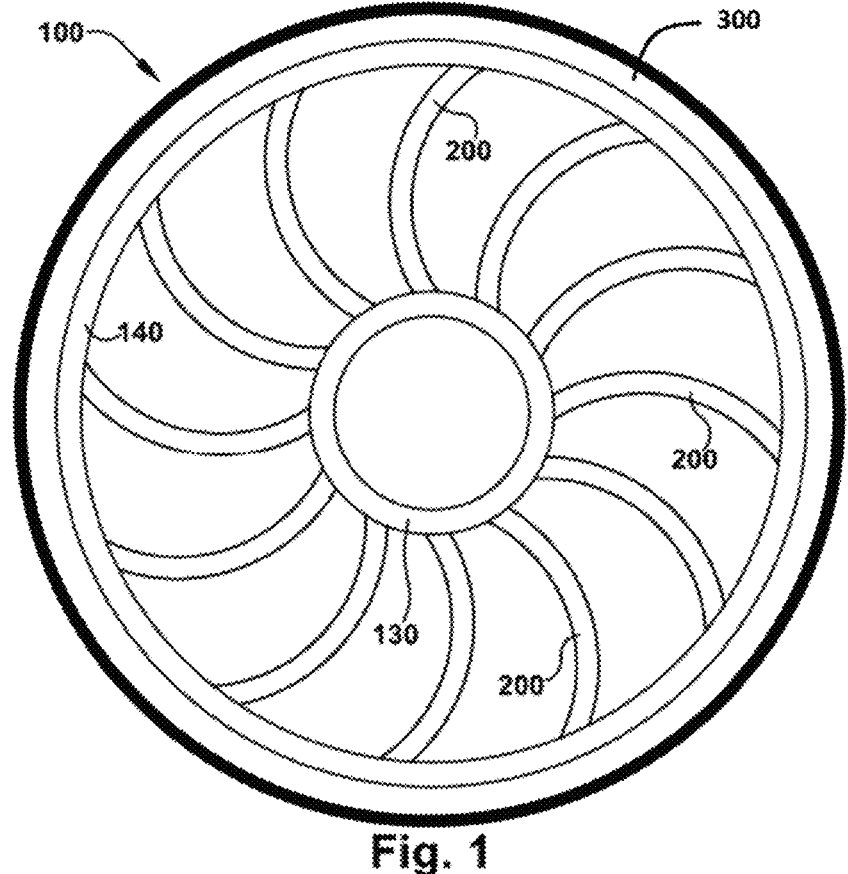
FIG. 1 is a front view of one embodiment of a non-pneumatic tire.
Figure 2:
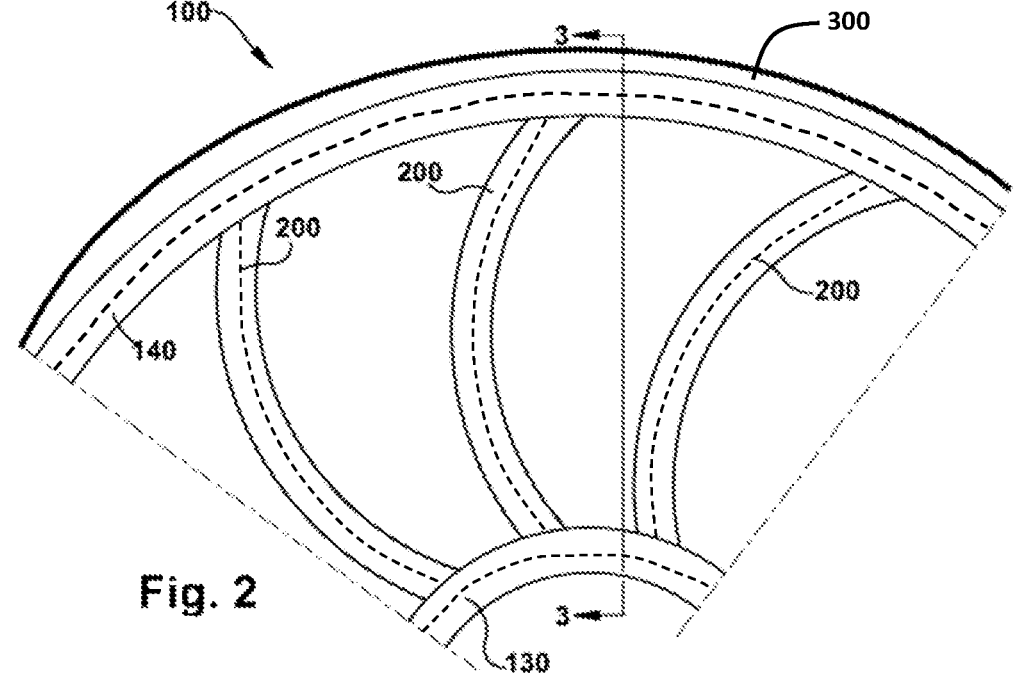
FIG. 2 is an enlarged partial front view of the non-pneumatic tire of FIG. 1.
Figure 3:
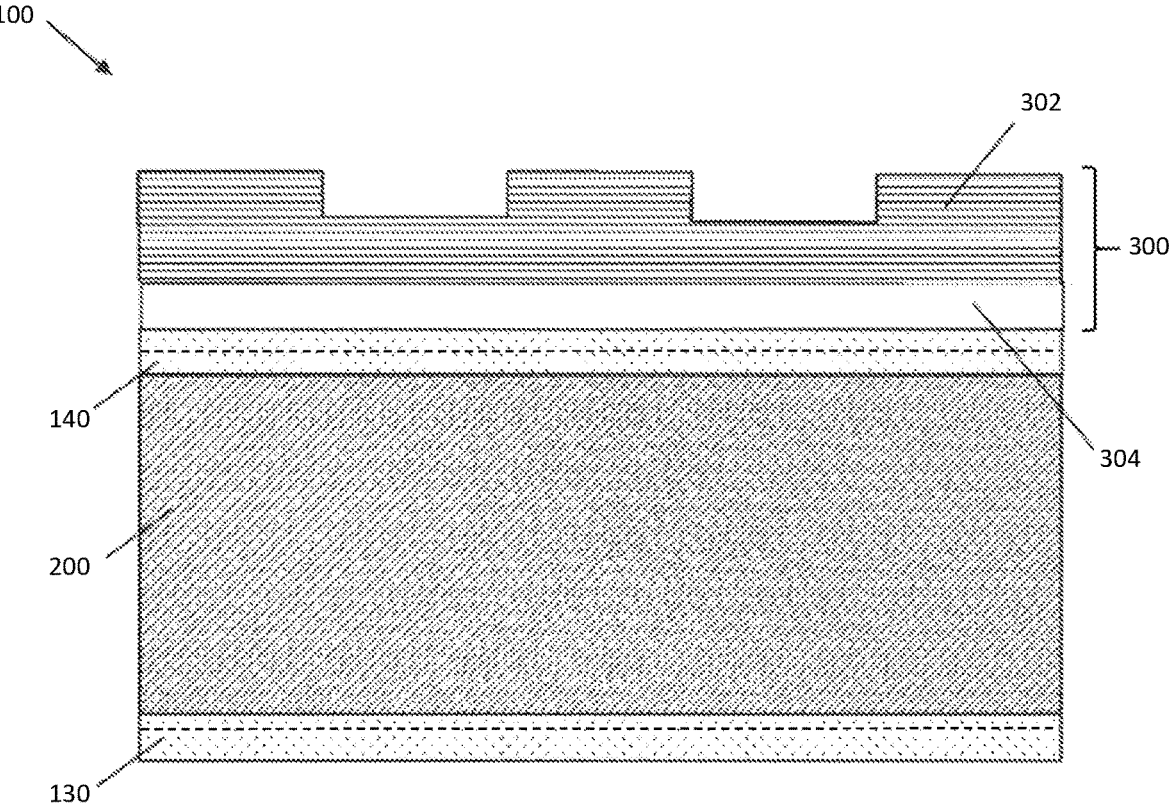
FIG. 3 is a sectional view of the non-pneumatic tire of FIG. 2 along 3-3.

FIGS. 1-3 illustrate one embodiment of a non-pneumatic tire 100. The non-pneumatic tire 100 includes a lower ring 130 having a first diameter, and an upper ring 140 having a second diameter greater than the first diameter. The upper ring 140 is coaxial with the lower ring 130. The lower ring 130 may engage a vehicle hub (not shown) for attaching the non-pneumatic tire 100 to a vehicle.

Spokes 200 extend between and connect the lower ring 130 to the upper ring 140. In the illustrated embodiment, the spokes 200 are curved. In an alternative embodiment, the spokes may have a more pronounced curve, such that they are substantially C-shaped. In other alternative embodiments, the spokes may be any desired shape. For example, the spokes may be substantially V-shaped or serpentine shaped. In yet other alternative embodiments, the non-pneumatic tire may include spokes of two or more different shapes. For example, the non-pneumatic tire may include C-shaped spokes that alternate with V-shaped spokes along a circumferential direction of the non-pneumatic tire. In still another alternative embodiment, the spokes may be replaced with a webbing or other support structure.

A circumferential tread 300 is attached to the upper ring 140. The circumferential tread 300 includes a tread layer 302 and a tread band 304 positioned between the tread layer 302 and the upper ring 140. The tread layer 302 may be made out of rubber or other elastomeric material, and may include tread elements (not shown) such as grooves, ribs, blocks, lugs, sipes, studs, or any other desired elements. In an alternative embodiment, the tread layer may be omitted and tread elements may be formed directly on the upper ring.

Other components of the non-pneumatic tire 100 may be made of various materials. The lower ring 130 or the upper ring 140 may be made of an elastomeric material or metal. The spokes 200 may also be made of an elastomeric material or metal. The tread band 304 may be made of rubber, metals including, without limitation, ultra-high strength steel, stainless steel, aluminum, brass, or copper, rubber, or polymeric materials including, without limitation, polyurethane, polyester, or polyvinyl chloride. In alternative embodiments, the lower ring, the upper ring, or the tread band may be made of any desired material. Certain materials may be selected for certain components in order to provide the non-pneumatic tire with desired performance characteristics.

Figure 4A:
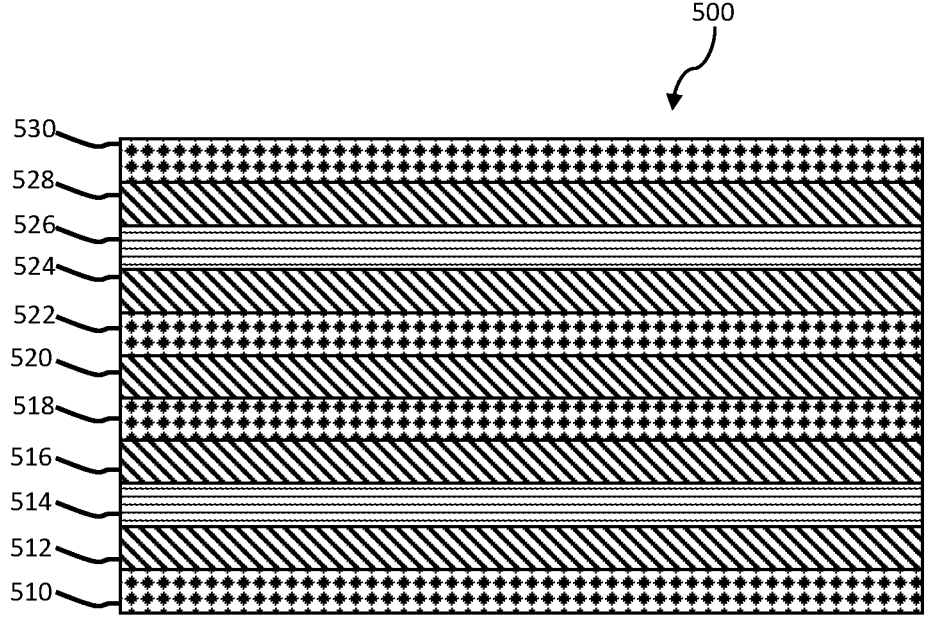
FIG. 4a is a detailed cross-sectional view of one embodiment of a fiber metal laminate that may be used in various parts of the non-pneumatic tire of FIG. 1.
Figure 4B:
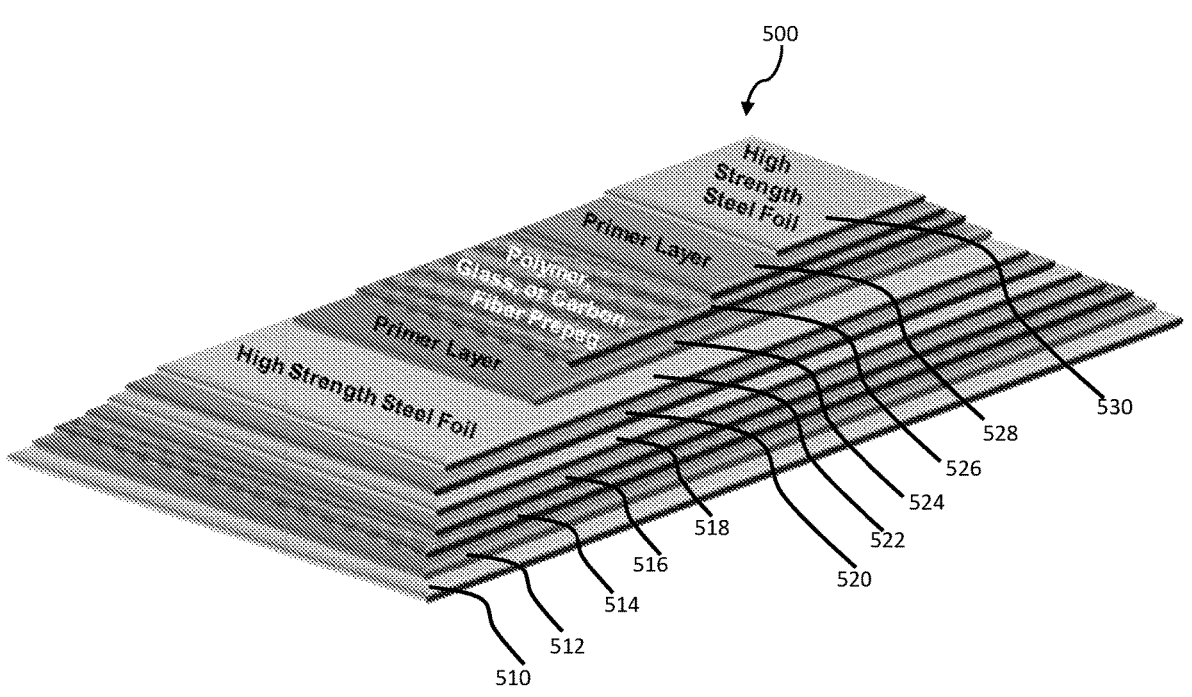

Regardless of the material used to manufacture the non-pneumatic tire 100, the lower ring 130, the upper ring 140, the spokes 200, or the tread band 304 may be reinforced with a fiber metal laminate. In alternative embodiments, rather than being provided as reinforcement, fiber metal laminate may be used to manufacture the entire lower ring, upper ring, spokes, or tread band. FIGS. 4a and 4b, illustrate one example embodiment of a fiber metal laminate 500 that may be used to reinforce or manufacture components of the non-pneumatic tire 100. In the illustrated embodiment, the fiber metal laminate 500 includes eleven layers 510-530 that are provided as a metal foil, a primer, or a fiber and resin combination.

When the fiber metal laminate 500 is used in the lower ring 130, the upper ring 140, or the tread band 304, the layers 510-530 may be arranged so that each layer extends in a substantially circumferential direction of the non-pneumatic tire 100, with the layers being oriented such that the layers are built upon one another in a substantially radial direction of the non-pneumatic tire 100. An exemplary orientation of the fiber metal laminate 500 in the lower ring 130 and the upper ring 140 is shown with dashed lines in FIGS. 2 and 3. When the fiber metal laminate 500 is used in the spokes 200 or other support structure, the layers may be arranged so that each layer extends in a substantially radial direction of the non-pneumatic tire 100. An exemplary orientation of the fiber metal laminate 500 in the spokes 200 is shown with dashed lines in FIG. 2. According to this example, the layers may be oriented such that the layers are built upon one another in a substantially circumferential direction of the non-pneumatic tire 100. In alternative embodiments, the layers may have any desired arrangement or orientation. For example, when the fiber metal laminate is used in the spokes or other support structure, the layers may be arranged so that each layer extends in a substantially radial direction of the non-pneumatic tire, with the layers being oriented such that the layers are built upon one another in a substantially axial direction of the non-pneumatic tire.

A first layer 510, a fifth layer 518, a seventh layer 522, and an eleventh layer 530 are provided as a metal foil. According to one example embodiment, the metal foil is formed from stainless steel. In alternative embodiments, the metal foil may be formed from high strength aluminum, hard coated steel, or passivated steel (e.g., 4340 with aluminum silicon hypereutectic alloys or carbide/nitride coating).

A third layer 514 and a ninth layer 526 are provided as a fiber and resin combination. According to one example embodiment, the fiber and resin combination is provided utilizing a fiber prepreg that includes fibers pre-impregnated with a resin system. In alternative embodiments, the fiber and resin combination is provided utilizing plain fibers (i.e., not pre-impregnated with a resin system) and a resin transfer process, whereby the plain fibers are placed into a mold and the resin is subsequently injected into the mold. Compared to the fiber prepreg, the plain fiber and resin transfer process allows for increased design flexibility. The fiber prepreg, however, offers a simpler manufacturing process and time savings compared to the plain fibers and resin transfer process. In either the fiber prepreg or the plain fibers and resin transfer process, the fiber may be polymeric, glass, carbon, metallic, or any other desired fiber or combination of fibers. In either the fiber prepreg or the plain fibers and resin transfer process, the resin system may be a thermosetting or thermoplastic type. Examples of resin systems include, but are not limited to epoxy, polyurethane, polyacrylate, polysiloxane, vinyl ester, polyester, resins derived from dicyclopentadiene or norbornene monomers, or any other desired resin system or combination of resin systems. Specific examples of resins derived from norbornene monomers include Proxima Syntatic Thermoset Resins (STR), High Performance Resins (HPR), and Advanced Composites Resins (ACR) from MATERIA INC. Impact modifiers may optionally be added to the resin to improve toughness of the fiber and resin combination layers. According to one example embodiment, the impact modifier includes a multilayer-structure polymer particle design as produced by KANEACE®. In alternative embodiments any desired impact modifier may be used.

A second layer 512, a fourth layer 516, a sixth layer 520, an eighth layer 524, and a tenth layer 528 are provided as a primer. The primer may promote bonding between the metal foil layers and the fiber and resin combination layers. According to one example embodiment, the primer may be produced from a sol-gel style reaction onto the surface of the metal foil. In alternative embodiments, the primer may be produced from a chelating process, brass coating process, zinc phosphating coating process, or any other desired process. In other alternative embodiments, the primer may be omitted.

According to one example embodiment, the thickness of each of the metal foil layers 510, 518, 522, 530 and the fiber and resin combination layers 514, 526 may be 0.005-0.100 mm, and the number of interfaces between the metal foil layers and the fiber and resin combination layers may be 5-50. According to this example embodiment, the volume fraction of the metal with these properties is 15% or less of the total volume of the fiber metal laminate 500. In alternative embodiments, different layer thicknesses, interface numbers, and percentages of the volume fraction of the metal may be provided to yield different performance characteristics that may allow tuning of the non-pneumatic tire for different applications.

Using the fiber metal laminate 500 in the lower ring 130, the upper ring 140, the spokes 200, or the tread band 304 may improve the performance and robustness of the non-pneumatic tire 100 while at the same time reducing the weight of the non-pneumatic tire 100. Interlaying the metal foil layers 510, 518, 522, 530 between the fiber and resin combination layers 514, 526 may improve impact and fatigue properties of the non-pneumatic tire 100, as the metal foil layers 510, 518, 522, 530 may arrest cracks that develop in the fiber and resin combination layers 514, 526 and prevent the propagation of cracks throughout the non-pneumatic tire 100. Different metal foils, fiber and resin combinations, and primers may yield different performance characteristics that may allow tuning of the non-pneumatic tire for different applications. For example, the overall strength of the non-pneumatic tire may be improved by replacing certain directional fiber layers within the fiber and resin combination layers that traditionally prioritize impact performance over composite strength. Specifically, according to one example, the direction of the fibers is fully circumferential (i.e., zero degree), which may provide high strength and benefit from the interlaid metal foil layers to assist in impact performance.

In alternative embodiments, the fiber metal laminate may include a fewer or greater number of layers. Additionally, in other alternative embodiments, the different layers may be provided in any desired order. For example, in the embodiment shown in FIGS. 4a and 4b, beginning at the first layer 510 and moving toward the eleventh layer 530, there are provided, in sequence, a layer of metal foil, primer, fiber and resin combination, primer, metal foil, primer, metal foil, primer, fiber and resin combination, primer, and metal foil. In the alternative embodiments, this sequence may be a layer of metal foil, primer, metal foil, primer, fiber and resin combination, primer, fiber and resin combination, primer, metal foil, primer, and metal foil. Furthermore, in other alternative embodiments, the ratio of the different layers may be any desired ratio. For example, in the embodiment shown in FIGS. 4a and 4b, there are four layers of metal foil, five layers of primer, and two layers of fiber and resin combination. In the alternative embodiments, this ratio may be to two layers of metal foil, fiver layers of primer, and four layers of fiber and resin combination. Different numbers of layers, different sequencing of layers, and different ratios of layers may yield different performance characteristics that may allow tuning of the non-pneumatic tire for different applications.

Figure 5:
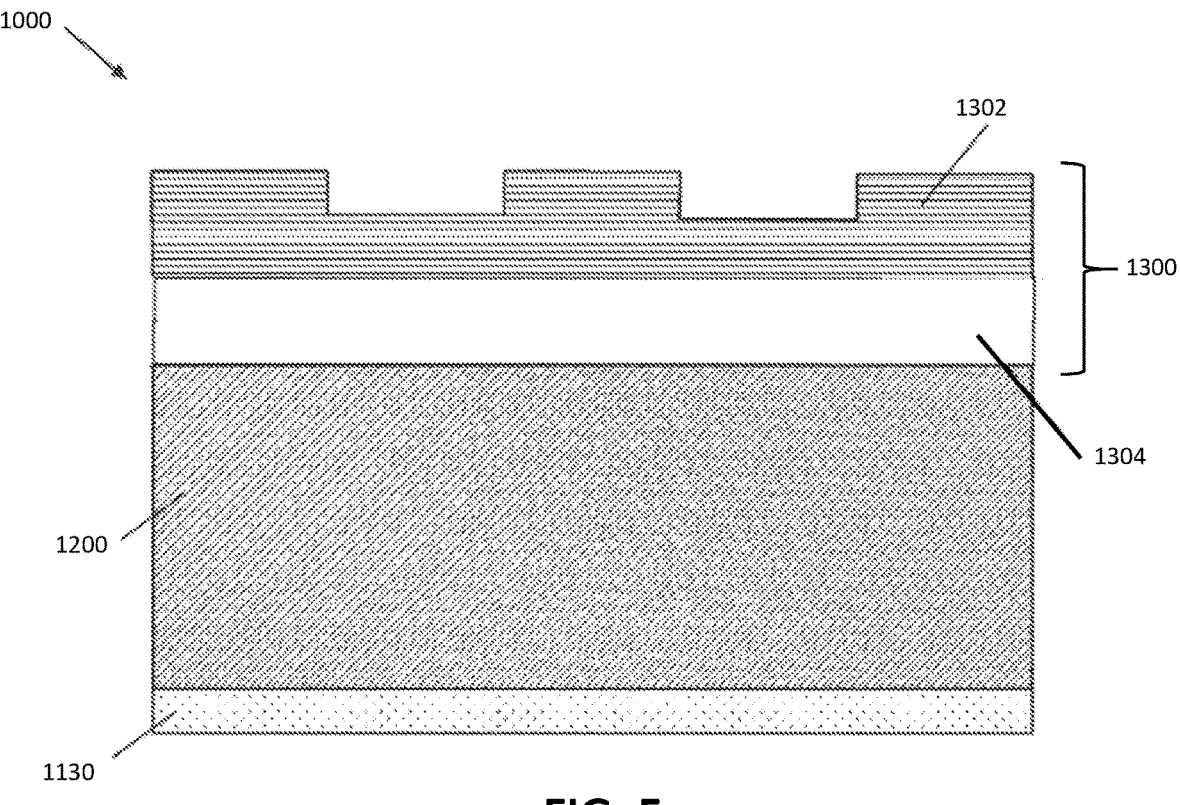
FIG. 5 is sectional view of another embodiment of a non-pneumatic tire.

FIG. 5 illustrates another example embodiment of a non-pneumatic tire 1100. The non-pneumatic tire 1100 of FIG. 5 is substantially similar to the non-pneumatic tire 100 of FIGS. 1-3, except the differences described herein. Accordingly, like features will be identified by like numerals increased by a value of "1000."

The non-pneumatic tire 1100 includes a lower ring 1130 and a circumferential tread 1300. The circumferential tread 1300 includes a tread layer 1302 and a tread band 1304. Unlike the non-pneumatic tire 100 of FIGS. 1-3, the non-pneumatic tire 1100 does not have an upper ring. Thus, the circumferential tread 1300 is attached to the lower ring 1130 by spokes 1200 or other support structure that interconnect the lower ring 1130 to the tread band 1304. The lower ring 1130, the spokes 1200, or the tread band 1304 may be manufactured from the fiber metal laminate 500 described above and shown in FIGS. 4a and 4b. According to this embodiment, a further benefit may be realized by using fiber metal laminate in that the spokes 1200 or other support structure and the tread band 1304 may be manufactured as an integral unit by a single winding process. Compared to known manufacturing techniques that require support structure and a tread band to be manufactured separately and subsequently connected, the integral spokes 1200 and tread band 1304 unit may increase strength and reduce costs by eliminating weak points and junctures between dissimilar materials, and eliminate adhesive joints.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:

a lower ring having a first diameter;

an upper ring having a second diameter greater than the first diameter, the upper ring being substantially coaxial with the lower ring; and support structure connecting the lower ring to the upper ring;

wherein at least one of the lower ring, the upper ring, and the support structure includes a fiber metal laminate having at least one metal foil layer and at least one fiber and resin combination layer.

2. The non-pneumatic tire of claim 1, wherein the fiber metal laminate further includes at least one primer layer.

3. The non-pneumatic tire of claim 1 further comprising a circumferential tread attached to the upper ring, the circumferential tread including a tread layer and a tread band positioned between the tread layer and the upper ring, the tread band being manufactured from the fiber metal laminate.

4. The non-pneumatic tire of claim 1, wherein the at least one metal foil layer is formed from at least one of stainless steel, high strength aluminum, hard coated steel, and passivated steel.

5. The non-pneumatic tire of claim 1, wherein at least one fiber and resin combination layer includes fibers formed from at least one of polymer, glass, carbon, and metal, and a resin formed from at least one of epoxy, polyurethane, polyacrylate, and polysiloxane.

6. The non-pneumatic tire of claim 2, wherein the at least one primer layer is produced from at least one of a sol-gel reaction, chelating process, brass coating process, and zinc phosphating coating process.

7. The non-pneumatic tire of claim 1, wherein each of the lower ring and the upper ring includes the fiber metal laminate, and wherein the at least one metal foil layer and the at least one fiber and resin combination layer are each arranged so as to extend in a substantially circumferential direction of the non-pneumatic tire, and are oriented so as to be built upon one another in a substantially radial direction of the non-pneumatic tire.

8. The non-pneumatic tire of claim 1, wherein the support structure is provided as a plurality of spokes that include the fiber metal laminate, and wherein the at least one metal foil layer and the at least one fiber and resin combination layer are each arranged so as to extend in a substantially radial direction of the non-pneumatic tire, and are oriented so as to be built upon one another in a substantially circumferential direction of the non-pneumatic tire.

9. The non-pneumatic tire of claim 3, wherein the at least one metal foil layer and the at least one fiber and resin combination layer of the fiber metal laminate that the tread band is manufactured from are each arranged so as to extend in a substantially circumferential direction of the non-pneumatic tire, and are oriented so as to be built upon one another in a substantially radial direction of the non-pneumatic tire.

10. A method of manufacturing a non-pneumatic tire comprising the steps of:

providing a lower ring having a first diameter, an upper ring having a second diameter that is greater than the first diameter, and support structure; and connecting the lower ring to the upper ring using the support structure;

wherein the step of providing the lower ring, the upper ring, and the support structure includes manufacturing at least one of the lower ring, the upper ring, and the support structure with a fiber metal laminate that includes at least one metal foil layer and at least one fiber and resin combination layer.

11. The method of manufacturing a non-pneumatic tire according to claim 10, wherein the fiber metal laminate further includes at least one primer layer.

12. The method of manufacturing a non-pneumatic tire according to claim 10 further comprising the steps of providing a circumferential tread and attaching the circumferential tread to the upper ring, the circumferential tread including a tread layer and a tread band positioned between the tread layer and the upper ring, the step of providing the circumferential tread including manufacturing the tread band from the fiber metal laminate.

13. The method of manufacturing a non-pneumatic tire according to claim 10, wherein the at least one metal foil layer is formed from at least one of stainless steel, high strength aluminum, hard coated steel, and passivated steel.

14. The method of manufacturing a non-pneumatic tire according to claim 10, wherein the at least one fiber and resin combination layer includes fibers formed from at least one of polymer, glass, carbon, and metal, and a resin system from at least one of epoxy, polyurethane, polyacrylate, and polysiloxane.

15. The method of manufacturing a non-pneumatic tire according to claim 11, wherein the at least one primer layer is produced from at least one of a sol-gel reaction, chelating process, brass coating process, and zinc phosphating coating process.

16. The method of manufacturing a non-pneumatic tire according to claim 10, wherein each of the lower ring and the upper ring are manufactured from the fiber metal laminate, and wherein the at least one metal foil layer and the at least one fiber and resin combination layer are each arranged so as to extend in a substantially circumferential direction of the non-pneumatic tire, and are oriented so as to be built upon one another in a substantially radial direction of the non-pneumatic tire.

17. The method of manufacturing a non-pneumatic tire according to claim 10, wherein the support structure is provided as a plurality of spokes that are manufactured from the fiber metal laminate, and wherein the at least one metal foil layer and the at least one fiber and resin combination layer are each arranged so as to extend in a substantially radial direction of the non-pneumatic tire, and are oriented so as to be built upon one another in a substantially circumferential direction of the non-pneumatic tire.

18. The method of manufacturing a non-pneumatic tire according to claim 12, wherein the at least one metal foil layer and the at least one fiber and resin combination layer of the fiber metal laminate that the tread band is manufactured from are each arranged so as to extend in a substantially circumferential direction of the non-pneumatic tire, and are oriented so as to be built upon one another in a substantially radial direction of the non-pneumatic tire.

19. A non-pneumatic tire comprising:

a lower ring;

a circumferential tread disposed above the lower ring, the circumferential tread including a tread layer and a tread band; and support structure that interconnects the lower ring to the tread band to attach the circumferential tread to the lower ring;

wherein at least one of the lower ring, the tread band, and the support structure includes a fiber metal laminate having at least one metal foil layer and at least one fiber prepreg layer.

20. The non-pneumatic tire of claim 19, wherein the tread band and the support structure are manufactured from the fiber metal laminate, the tread band and the support structure being manufactured as an integral unit by a single winding process.

* * * * *